United States Patent
Sofue et al.

[11] Patent Number: 6,128,259
[45] Date of Patent: Oct. 3, 2000

[54] OPTICAL PICKUP APPARATUS FOR ACCURATE DETECTION OF A TRACKING ERROR SIGNAL

[75] Inventors: Masaaki Sofue, Tokyo; Tatsuaki Sakurai; Ryuuji Kudou, both of Kanagawa-ken, all of Japan

[73] Assignee: Ricoh Co., Ltd., Yokohama, Japan

[21] Appl. No.: 09/038,990

[22] Filed: Mar. 12, 1998

[51] Int. Cl.[7] ............................................ G11B 7/00
[52] U.S. Cl. ............................ 369/44.37; 369/44.23; 369/110
[58] Field of Search ................ 369/44.12, 44.23, 369/44.24, 112, 110, 109, 103, 44.37

[56] References Cited

U.S. PATENT DOCUMENTS

| | | | |
|---|---|---|---|
| 4,694,443 | 9/1987 | Ando | 369/44.24 |
| 4,725,721 | 2/1988 | Nakamura et al. | 369/44.24 |
| 4,888,755 | 12/1989 | Itoh | 369/44.23 |
| 5,073,888 | 12/1991 | Takahashi et al. | 369/110 |
| 5,084,851 | 1/1992 | Noda et al. | 369/44.24 |
| 5,105,411 | 4/1992 | Ishika | 369/44.23 |
| 5,161,139 | 11/1992 | Inoue et al. | 369/44.23 |
| 5,434,841 | 7/1995 | Nishikawa | 369/44.24 |
| 5,487,058 | 1/1996 | Kitabayashi | 369/44.24 |

OTHER PUBLICATIONS

"Optical Pickup System Point of Development."

*Primary Examiner*—Nabil Hindi
*Attorney, Agent, or Firm*—Dickstein Shapiro Morin & Oshinsky LLP

[57] ABSTRACT

In order to accurately detect a tracking error signal, the position of a sub-beam Bs1 with a lower shading rate is located at a position ahead of the position of a main beam Bm in the recording direction of an optical disk, and the position of a sub-beam Bs2 with a higher shading rate is located at a position behind the position of the main beam Bm in the recording direction of the optical disk. Therefore, the unequal amount of optical information created by the different shading rates is counterbalanced by the fact that the portions of the optical disk where the sub-beams Bs1 and Bs2 are directed have different reflective rates. Accordingly, the amount of optical information from each sub-beam received by the tracking error signal photo detector is made equal, and the tracking error signal can be accurately detected.

17 Claims, 3 Drawing Sheets

OPTICAL PICKUP APPARATUS FOR ACCURATE DETECTION OF A TRACKING ERROR SIGNAL

BACKGROUND OF THE INVENTION

1. Field of the Invention

The present invention relates to an optical pickup apparatus which detects a focusing error signal by the "knife edge" method.

2. Description of the Related Art

In general, an optical pickup apparatus requires a tracking servo control unit and focusing servo control unit in order to focus a beam on an optical recording media, and follow a beam on the track when recording, reproducing and erasing information.

The present invention corrects the focusing error by detecting a focusing error signal and controlling a focusing servo, in response to said detection. The asymmetry aberration method or "knife edge" method is used as the method for detecting the focusing error signal.

Furthermore, the present invention corrects tracking error by detecting a tracking error signal for controlling the tracking servo. There are many kinds of methods for detecting such a tracking error signal. One of these methods is the "three beam" method which uses a main beam and two sub-beams. The sub-beams are formed before and behind the main beam in the direction of the track. This method is disclosed in detail in "Optical Pickup System Point of Development" which is published by the Japan Industrial Technique Center. When using the "three beam" method, the tracking error signal is detected as a difference in the amount of optical information between the two sub-beams. Therefore, it is customary to shift the sub-beams to positions one fourth of the track pitch from the track center in a direction across the track for getting the highest detective sensitivity. In other words, the sub-beams appear at positions one fourth of the track pitch before and after the main beam.

Another method for detecting the tracking error signal is a "differential push-pull" method. A main beam and two sub-beams are also used in this method. However, the positions of the sub-beam spots are shifted half track pitch (as opposed to one fourth track pitch). A tracking error signal is detected by detecting the push-pull signals of the reflective rays of the main beam and sub-beams respectively, and obtaining the difference between them.

However, when the "three beam" method or the "differential push-pull" method is applied to a pickup apparatus detecting the focusing signal by the "knife edge" method, the shading rate for each reflective beam is different. One sub-beam is mostly reflected by the knife edge and the other is inclined not to be reflected. Therefore, there is a difference in the shading rate for the two sub-beams. This causes the amount of optical information received by a photo detector to be unequal. Therefore, even if there is not tracking error, a tracking error is registered due to the inequality in the shading rate.

SUMMARY OF THE INVENTION

It is therefore an object of the present invention to provide for an optical pick up apparatus which can correct the unequal optical signals received by the photo detector when utilizing the "knife edge" method.

In accordance with first structure of the present invention, an optical pick up apparatus is provided with a laser beam passing through an object lens which produces on a disk a main spot for recording, reproducing and erasing information, and two sub-spots formed before and behind said main spot; photo detectors for receiving reflective beams from these spots and for detecting a focusing error signal by the "knife edge" method, and for detecting a tracking error signal by either the "three beam" method or the "differential push-pull" method. In the invention, the position of the sub-beam with the lower shading rate is ahead of the position of the main beam in the recording direction of the optical disk, while the position of the sub-beam with the higher shading rate is behind the position of the main beam in the recording direction of the optical disk.

In this structure, the sub-beam with the lower shading rate is mostly reflected by the knife edge, and the amount of optical information appearing at the photo detector for detecting the tracking error signal is small. However, when recording on the recording media, this sub-beam is located on a non-recording portion of the recording media which is ahead of the main beam and which has a high reflective rate. Therefore, the reflective ray is strong.

On the other hand, the sub-beam with the higher shading rate is reflected by the knife edge and the amount of optical information appearing at the photo detector for detecting the tracking error signal is large. However, when recording on the recording media, this sub-beam is located on a recorded portion of the recording media which is behind the main beam and which has a low reflective rate. Therefore, the reflective ray is weak.

Accordingly, in consideration of the above, the present system directs the beams in a manner to equalize these differences. The present system directs the sub-beam which is highly reflected by the optical recording apparatus to a position on the knife edge where the shading rate is lower, and directs the sub-beam which is only slightly reflected to a position on the knife edge where the shading rate is high. By doing this, the system makes the signals which appear at the photo detector of equal magnitude. Hence, the tracking error signal can be detected accurately.

BRIEF DESCRIPTION OF THE DRAWINGS

FIG. 1 is a view showing one embodiment of the present invention:

DESCRIPTION OF THE PREFERRED EMBODIMENTS

The preferred embodiments of the optical pick up apparatus of the present invention will next be described in detail with reference to the accompanying drawings. The optical pick up apparatus in accordance with the present invention detects the focusing error signal by the "knife edge" method and the tracking signal by the "three beam" method.

Figure 2:
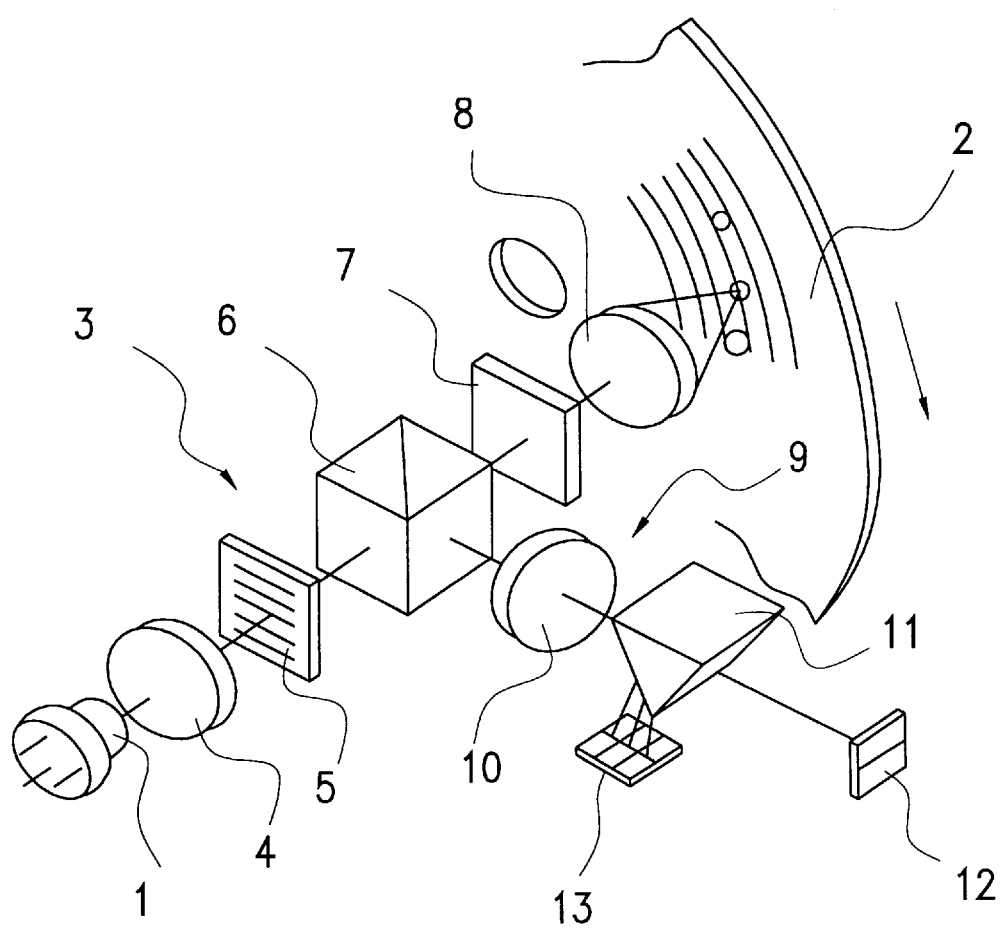
FIG. 2 is a perspective view showing the structure of the optical pick up apparatus.

First, as shown in FIG. 2, an optical pickup apparatus 3 is provided which has a beam irradiated from the laser diode 1 which is in turn focused and radiated on the optical disk 2, which is rotated in direction of the arrow. The optical pickup apparatus 3 includes a collimator lens 4, a diffraction lattice 5, a polarized beam splitter means 6, a quarter wave plate 7 and an objective lens 8, which are arranged in the optical path. A detective optical arrangement 9 is also provied which uses the objective lens 8, the quarter wave plate 7 and the polarized beam splitting means 6. This detective optical arrangement 9 also includes a detective lens 10 located in the reflective path of the polarized beam splitter 6, a knife edge 11, a photo detector 12 for detecting the focusing error signal located on the optical path behind the knife edge, and a photo detector 13 for detecting the tracking error signal located on the path reflected by the knife edge 11.

Figure 3:
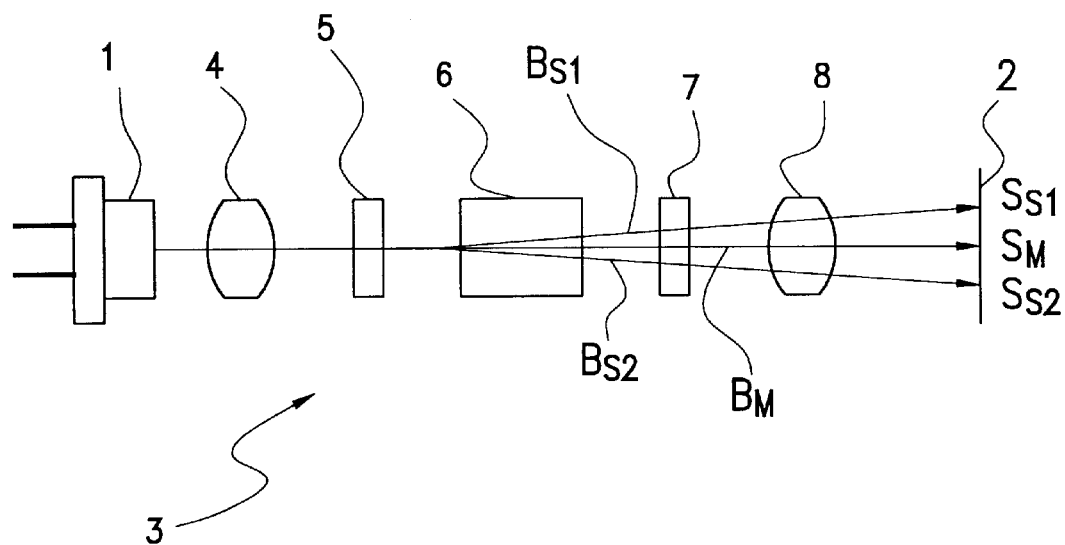
FIG. 3 is an elevated view showing the optical pickup apparatus.

Accordingly, as shown in FIG. 3, a laser beam irradiated from the laser diode 1 is changed into a parallel ray by the collimator lens 4. Then, the parallel ray is divided into plural beams Bm, Bs1, Bs2 by the diffraction lattice 5. After the divided rays pass through the polarized beam splitting means 6 and the quarter wave plate 7, they are radiated and focused on the optical disk 2 as minute spots Sm, Ss1, Ss2 by the objective lens 8. Beams Bm, Bs1, and Bs2 correspond to spots Sm, Ss1, and Ss2, respectively.

Figure 1A:
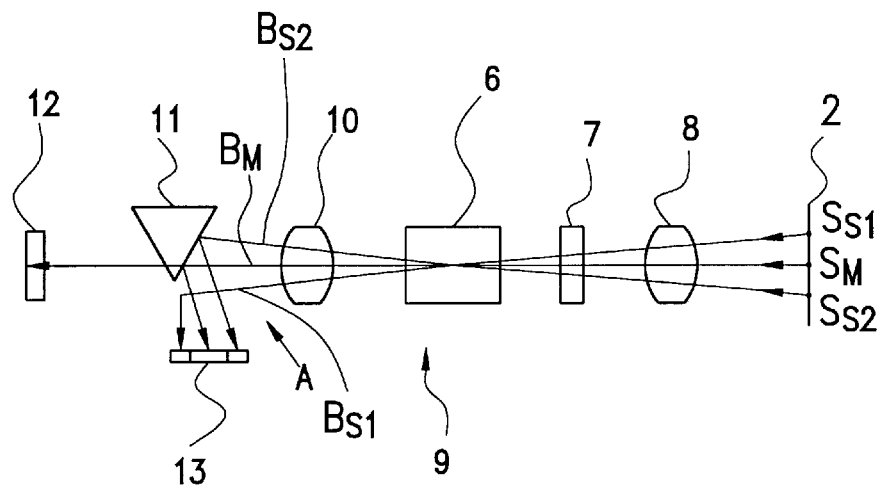
FIG. 1(a) is a side view showing a detective optical arrangement.

As shown in FIG. 1(a), the reflective beams of these spots Sm, Ss1, Ss2 from the optical disk 2 become parallel beams passing through the objective lens 8 again. The reflected beams continue on to the quarter wave plate 7 and their polarizing direction is changed by 90 degrees. Therefore, instead of being radiated forward to the diffraction lattice 5, the reflected beams are directed at a 90 degree angle towards detective lens 10. They are then directed to the knife edge 11 by the detective lens 10. From the knife edge 11, the reflected beams are directed towards photo detectors 12 and 13 for detection of focusing error and tracking error signals.

Figure 1B:
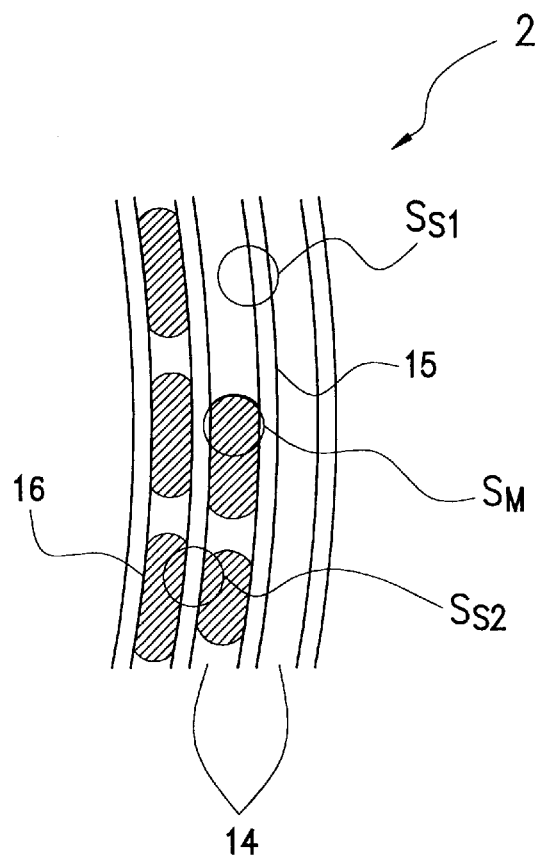
FIG. 1(b) is a plan view showing the positional relation of each spot on an optical disk.

It will be next explained how the three beams Bm, Bs1, Bs2 formed by the diffraction latitude 5, form spots Sm, Ss1, Ss2 on the optical recording media and are subsequently reflected to the knife edge 11, with reference to FIG. 1(b).

The beam Bm is a main beam used for recording, reproducing, erasing and detecting the focusing error signal. It is formed by diffracting a ray of zero dimension from the diffraction lattice 5 and radiating and focusing the beam as the main spot Sm on the track 14 of the optical disk 2. The beams Bs1, Bs2 are sub-beams used for detecting the tracking error signal. They are formed by diffracting a ray of ±1 dimension from the diffraction lattice 5 and radiating and focusing the sub-beams on positions which are shifted slightly (¼ track pitch, in the "three beam" method) from the position of the main beam Bm. These sub-beams are radiated on the optical disk 2 as sub-spots Ss1, Ss2 located before and behind the main spot Sm, respectively. When the sub-beam Bs1 is a beam with a lower shading rate by the knife edge than that of the sub-beam Bs2, the sub-spot Ss1 formed by the sub-beam Bs1 locates at a position ahead of the position of the main spot Sm formed by the main beam Bm in the recording direction. Accordingly, the sub spot Ss2 formed by the sub-beam Bs2 with a higher shading rate by the knife edge 11 locates at a position behind the position of the main spot Sm formed by the main beam Bm in the recording direction.

Figure 4:
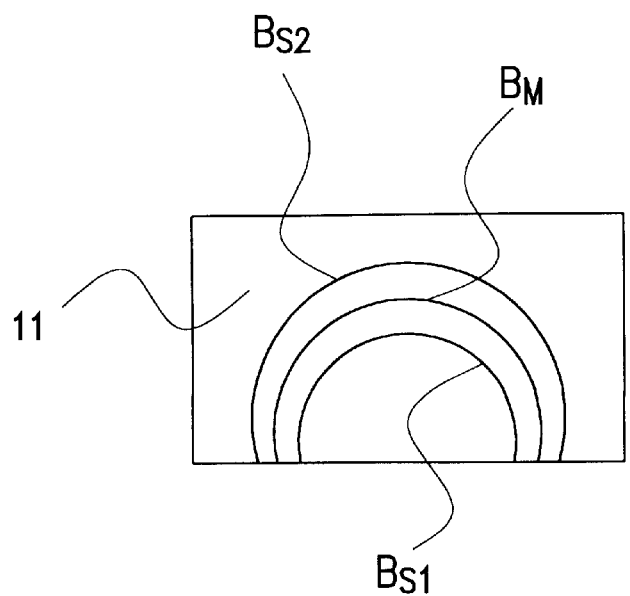
FIG. 4 is a view taken in the direction of the arrow A in FIG. 1 showing the beam reflected by the knife edge.

In such a structure, the reflective beams of the spots Sm, Ss1, Ss2 from the optical disk 2 are directed to the photo detectors 12, 13 via the knife edge 11 by the detective optical arrangement 9. Then, the sub-beam Bs1 corresponding to the sub-spot Ss1 locates on the side of the knife edge 11 with a lower shading rate. Therefore, as shown in FIG. 4, the amount of optical information directed to the photo detector 13 after being reflected by the knife edge 11 is a small (the lowermost semi-circle). On the other hand, the sub-beam Bs2 corresponding to the sub-spot Ss2 locates on the side of the knife edge 11 with a higher shading rate. Therefore, as shown in FIG. 4, the amount of optical information directed to the photo detector 13 after being reflected by the knife edge 11 is large (the uppermost semi-circle). In the conventional optical pickup apparatus, this variation in optical information would cause the system to register a tracking error even though no tracking error would be present, because the difference in magnitude of the sub-beams would be significant. Therefore, the magnitudes of the sub-beams must be equalized as will be explained below.

In the embodiment of the present invention, the sub-spot Ss1 corresponding to the sub-beam Bs1 locates at a position ahead of the main spot Sm on the disk 2 in the recording direction. As shown in FIG. 1(b), this portion of the disk 2 is non-recording portion 15 which has a high reflective rate. Therefore, the reflective strength of the sub-beam Bs1 is strong. On the other hand, the sub-spot Ss2 corresponding to the sub-beam Bm2 locates at a position behind the main spot Sm in the recording direction of the disk 2. This portion of the disk 2 is a recorded portion 16 which has a low reflective rate. Therefore, the reflective strength of the sub-beam Bs2 is weak.

Accordingly, when combining the effects created by the knife edge 11 and the recorded 16 and non-recording 15 portions of the optical disk 2, there is counterbalancing relationship. The sub-beam Bs1 which has a low shading rate based on the knife edge is reflected from the disk 2 with greater intensity than the sub-beam Bs2 which has a higher shading rate. This combination of the effects of reflection and shading rate causes the sub-beams Bs1 and Bs2 which appear at the photo detector 13 to be of substantially equal magnitude. Hence, there is less probability that a false tracking error will be detected. In accordance with the present embodiment, since the optical pick up apparatus itself has structural improvements, it can correct the unequal amount of optical information which would normally appear at the photo detector 13.

The present embodiment is shown as used with optical pick up apparatus which detects the tracking error signal by the "three beam" method. However, it can be applied to the optical pick up apparatus which detects the tracking error signal by the "differential push-pull" method.

As mentioned above, in accordance with the above structure, in the optical pick up apparatus which detects the focusing error signal by the "knife edge" method, the position of the sub-beam with the lower shading rate caused by the knife edge on the optical disk is located at a position ahead of the position of the main beam in the recording direction, and the position of the sub-beam with higher shading rate caused by the knife edge on the optical disk is located at a position behind the position of the main beam in the recording direction. Therefore, the unbalance created between the two sub-beams by the knife edge can be counterbalanced by using the unbalance of reflective rate between the non-recording portions and the recorded portions on the optical disk. Accordingly, the amount of optical information based on these sub-beams which appears at the photo detector for detecting the tracking error signal is equal, and the photo detector can accurately detect the tracking error signal.

What is claimed is:

1. An optical pickup apparatus comprising:
    a laser diode which forms three beams, comprising a main beam and two sub-beams;

an objective lens which focuses the three beams onto an optical disk as three spots, comprising a main spot and two sub-spots; and a detective lens which captures the portions of the three beams which are reflected from the optical disk and focuses them towards a knife edge, the knife edge directing the three reflected beams to a photo detector for detecting a tracking error signal;

wherein the sub-beam which is directed to a portion of the knife edge with a lower shading rate has its corresponding sub-spot located at a position on the optical disk ahead of the main spot in a recording direction, and the sub-beam which is directed to a portion of the knife edge with a higher shading rate has its corresponding sub-spot located at a position on the optical disk behind the main spot in the recording direction.

2. The optical pickup apparatus of claim 1, where the tracking error signal is detected using three optical beams.

3. The optical pickup apparatus of claim 1, where the tracking error signal is detected using a "differential push-pull" technique.

4. The optical pickup apparatus of claim 1, wherein the sub-spot located behind the main spot in the recording direction is located at least partially on a recorded area of the optical disk, and the sub-spot located ahead of the main spot in the recording direction is located at least partially on a non-recording area of the optical disk.

5. The optical pickup apparatus of claim 4, wherein the non-recording area of the optical disk reflects more of sub-beam directed towards it and the recorded area of the optical disk reflects less of the sub-beam directed towards it.

6. The optical pickup apparatus of claim 1, further including:

a collimator lens located between the laser diode and the objective lens in a first optical path;

a diffraction lattice located between the collimator lens and the objective lens in said first optical path;

a polarized beam splitter located between the diffraction lattice and the objective lens in said first optical path; and a quarter wave plate located between the polarized beam splitter and the objective lens in said first optical path.

7. The optical pickup apparatus of claim 6, wherein the detective lens, the knife edge, and the first photo detector are located in a second optical path which includes the polarized beam splitter.

8. The optical pickup apparatus of claim 7, wherein the second optical path is perpendicular to the first optical path.

9. The optical pickup apparatus of claim 7, further including:

a second photo detector located in said second optical path for detecting a focusing error signal.

10. A method of detecting a tracking error signal in an optical pickup apparatus comprising the steps of:

providing three laser beams which are focused on a optical disk as three spots, the three laser beams comprising a main beam and two sub-beams, and the three spots comprising a main spot and two sub-spots;

detecting the portions of the three beams which are reflected from the optical disk; and directing the reflected portions of the three beams towards a knife edge so that the sub-beam which forms a sub-spot located ahead of the main beam is directed towards a portion of the knife edge which has a lower shading rate, and the sub-beam which forms a sub-spot located behind the main beam is directed towards a portion of the knife edge which has a higher shading rate; and detecting the two sub-beams and determining a tracking error signal based on the difference in optical information between the two sub-beams.

11. The method of claim 10, wherein the step of detecting the two sub-beams comprises detecting the sub-beams using a "three beams" technique.

12. The method of claim 10, wherein the step of detecting the two sub-beams comprises detecting the sub-beams using a "differential push-pull" technique.

13. The method of claim 10, wherein the step of directing the reflected portions of the three beams comprises:

initially directing the sub-beam directed towards the portion of the knife edge with the lower shading rate to a non-recording portion of the optical disk, and initially directing the sub-beam directed towards the portion of the knife edge with the higher shading rate to a recorded portion of the optical disk.

14. The method of claim 10, comprising the further steps of:

providing a laser diode to provide the three laser beams in a first optical path;

providing an objective lens for focusing the three laser beams on the optical disk in said first optical path;

providing a collimator lens between the laser diode and the objective lens in said first optical path;

providing a diffraction lattice between the collimator lens and the objective lens in said first optical path;

providing a polarized beam splitter between the diffraction lattice and the objective lens in said first optical path; and providing a quarter wave plate between the polarized beam splitter and the objective lens in said first optical path.

15. The method of claim 14, comprising the further steps of:

providing a detective lens for detecting the portion of the three beams which are reflected from the optical disk;

providing a first photo detector for detecting the two sub-beams; and arranging the polarized beam splitter, the detective lens, the knife edge and the first photo detector in a second optical path.

16. The method of claim 15, wherein the second optical path is perpendicular to the first optical path.

17. The method of claim 15, including the further step of:

providing a second photo detector for detecting a focusing error signal in said second optical path.

* * * * *